(12) United States Patent
Leiser et al.

(10) Patent No.: US 9,217,531 B2
(45) Date of Patent: Dec. 22, 2015

(54) MOUNTING APPARATUS AND SYSTEM THEREOF

(75) Inventors: Judson M. Leiser, Corvallis, OR (US);
James W. Ring, Biodgett, OR (US);
Karen A. St. Martin, Lebanon, OR (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 440 days.

(21) Appl. No.: 13/808,764

(22) PCT Filed: Jul. 14, 2010

(86) PCT No.: PCT/US2010/041899
§ 371 (c)(1),
(2), (4) Date: Jan. 7, 2013

(87) PCT Pub. No.: WO2012/008953
PCT Pub. Date: Jan. 19, 2012

(65) Prior Publication Data
US 2013/0111722 A1 May 9, 2013

(51) Int. Cl.
*F16L 33/22* (2006.01)
*F16L 55/00* (2006.01)
(52) U.S. Cl.
CPC .............. *F16L 55/00* (2013.01); *F16L 33/22* (2013.01); *F16L 33/227* (2013.01); *Y10T 29/53987* (2015.01)
(58) Field of Classification Search
CPC ....... F16L 33/222; F16L 33/224; F16L 33/22; F16L 19/04; F16L 19/045; F16L 19/00; F16L 25/00
See application file for complete search history.

(56) References Cited

U.S. PATENT DOCUMENTS

| 2,452,275 | A | * | 10/1948 | Woodling | 285/341 |
| 2,873,985 | A | * | 2/1959 | Baldwin, Jr. | 285/342 |
| 3,606,396 | A | * | 9/1971 | Prosdocimo | 285/148.18 |
| 3,918,679 | A | * | 11/1975 | Silvana | 251/149.1 |
| 3,980,325 | A | * | 9/1976 | Robertson | 285/249 |
| 4,236,736 | A | * | 12/1980 | Anderson | 285/125.1 |
| 4,257,629 | A | * | 3/1981 | Maple et al. | 285/12 |
| 4,705,304 | A | * | 11/1987 | Matsuda et al. | 285/243 |
| 4,900,068 | A | * | 2/1990 | Law | 285/139.2 |

(Continued)

FOREIGN PATENT DOCUMENTS

| CN | 2207505 | 9/1995 |
| CN | 2273364 | 1/1998 |

(Continued)

OTHER PUBLICATIONS

TW Office Action dated Mar. 15, 2013 ~ Application No. 100113677 ~ 13 pages.

(Continued)

*Primary Examiner* — Lee D Wilson
*Assistant Examiner* — Tyrone V Hall, Jr.
(74) *Attorney, Agent, or Firm* — Trop Pruner & Hu, PC

(57) ABSTRACT

Mounting apparatus includes a shaft member having a shaft fluidic channel therein and a shaft exterior surface. The shaft exterior surface includes a base portion and a sidewall portion forming an intersecting angle therebetween. The mounting apparatus also includes a compression member disposed across from the sidewall portion of the shaft member.

15 Claims, 5 Drawing Sheets

(56) References Cited

U.S. PATENT DOCUMENTS

| | | | |
|---|---|---|---|
| 5,322,331 A * | 6/1994 | Waldschmidt et al. | 285/259 |
| 6,637,864 B2 | 10/2003 | Dewey et al. | |
| 7,210,771 B2 | 5/2007 | Neese et al. | |
| 7,434,845 B2 * | 10/2008 | Ogiso et al. | 285/319 |
| 2004/0090497 A1 | 5/2004 | Entingh et al. | |
| 2008/0309076 A1 | 12/2008 | Cormier | |

FOREIGN PATENT DOCUMENTS

| | | |
|---|---|---|
| CN | 2313141 | 4/1999 |
| CN | 2398496 | 9/2000 |
| CN | 2839788 | 11/2006 |
| JP | 2000-002385 A | 1/2000 |
| KR | 20-0329292 Y1 | 10/2001 |
| TW | 559264 | 10/2003 |

OTHER PUBLICATIONS

PCT Search Report ~ Application No. PCT/US2010/041899 dated Apr. 26, 2011.

The International Bureau of WIPO, International Preliminary Report on Patentability for PCT/US2010/041899 dated Jan. 24, 2013 (6 pages).

* cited by examiner

MOUNTING APPARATUS AND SYSTEM THEREOF

CROSS-REFERENCE TO RELATED APPLICATION

This application is a national stage application under 35 U.S.C. §371 of PCT/US2010/41899, filed Jul. 14, 2010.

BACKGROUND

Mounting apparatus secure conduits such as hoses to allow the flow of fluid through the hoses in a watertight manner. Such mounting apparatuses are used in fluid delivery systems to secure hoses to transport fluid such as pressurized air from a pressurized air chamber to a fluid supply. The mounting apparatuses include barbs thereon to securely hold the hoses in place.

BRIEF DESCRIPTION OF THE DRAWINGS

Exemplary non-limiting embodiments of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

DETAILED DESCRIPTION

In the following detailed description, reference is made to the accompanying drawings which form a part hereof, and in which is depicted by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Mounting apparatus typically connect conduits such as hoses having a compressible outer surface and/or wall portion. Generally, such a connection allows the flow of fluids therethrough in a watertight manner. Mounting apparatus tend to use barbs to enable secure placement of the conduit thereto. Such barbs, however, often require an installer to use great force, difficult hand operations, special tools and/or lubrication in installation of the conduit to the mounting apparatus. In accordance with examples of the present disclosure, a mounting apparatus is disclosed with does not require barbs. Rather, the mounting apparatus includes a shaft member and compression member to cooperate with each other in a manner to achieve a durable connection with a conduit without a need for applying great force during installation of the conduit thereon. Thus, reducing difficulty of conduit installation and avoiding the need for lubrication. That is, in examples of the present disclosure, the compression member includes a compression portion configured to compress an exterior wall surface of the conduit by a compressed amount in a manner such that an interior wall surface of the conduit is forced against a sidewall portion of a wall member of the shaft member and an end of a wall member of the conduit is forced against a base portion of the shaft member.

Figure 1A:
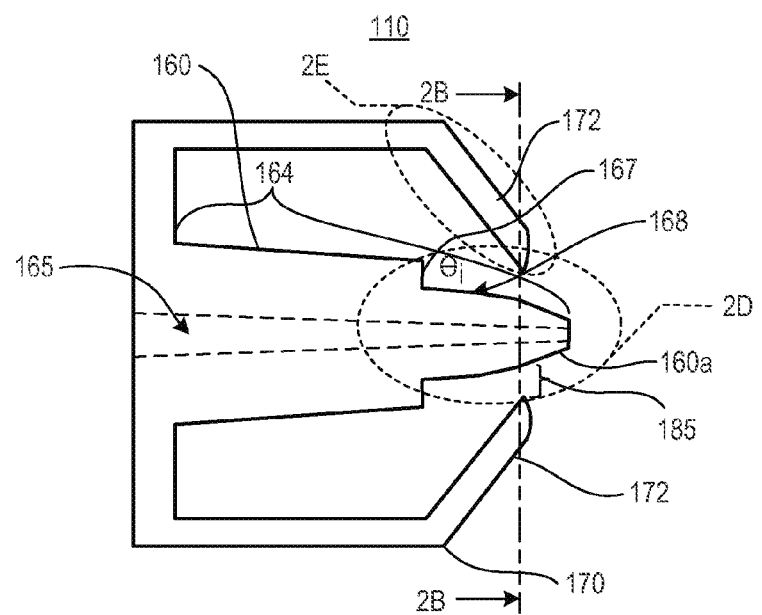
FIG. 1A is a side view illustrating a mounting apparatus in an uninstalled state according to an example of the present disclosure.
Figure 1B:
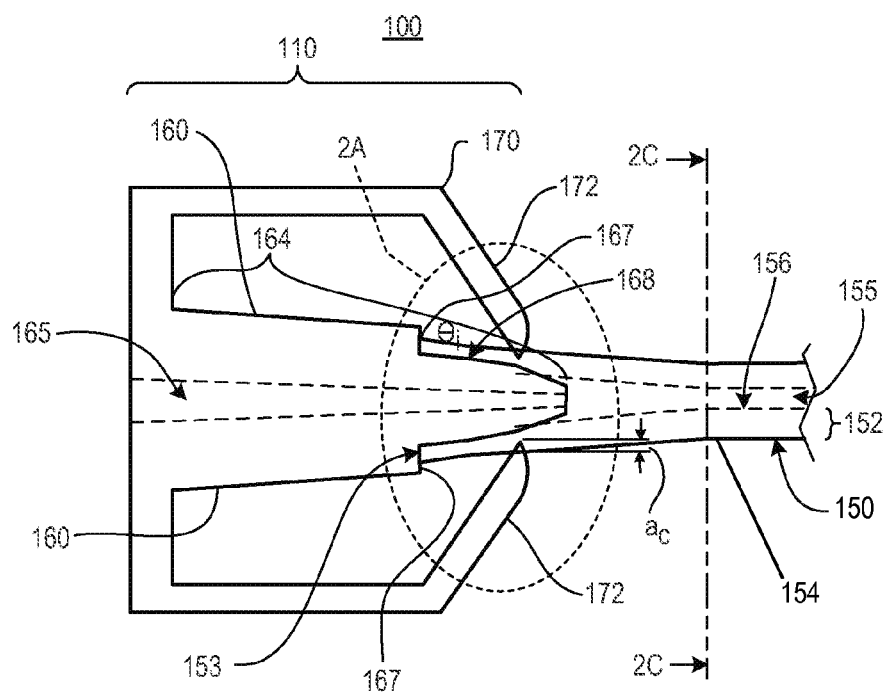
FIG. 1B is a side view illustrating a conduit mounting system including the mounting apparatus of FIG. 1A in an installed state with a conduit according to an example of the present disclosure.

FIG. 1A is a side view illustrating a mounting apparatus in an uninstalled state according to an example of the present disclosure. FIG. 1B is a side view illustrating a conduit mounting system 100 including the mounting apparatus of FIG. 1A in an installed state with a conduit according to an example of the present disclosure. Referring to FIG. 1B, in the present example, a conduit mounting system 100 includes a mounting apparatus 110 and a conduit 150, for example, with a compressible exterior wall surface 154 and/or wall member 152. In an example, the conduit 150 may include a conduit fluidic channel 155 therein and a wall member 152 surrounding the conduit fluidic channel 155. The wall member 152 of the conduit 150 may include an end 153, an exterior wall surface 154, and an interior wall surface 156.

Referring to FIGS. 1A and 1B, the mounting apparatus 110 includes a shaft member 160 and a compression member 170. In an example, the shaft member 160 may be elongated and/or generally cylindrical. In an example, the compression member 170 may be integral with the shaft member 160 or connected to the shaft member 160, for example, either directly or indirectly through another member. In the present example, the shaft member 160 includes a shaft exterior surface 164 and a shaft fluidic channel 165 therein. The shaft exterior surface 164 includes a base portion 167 and a sidewall portion 168 forming an intersecting angle $\theta_i$ therebetween. In examples, the intersecting angle $\theta_i$ is in a range of 85-95 degrees to generally allow a flush fit between the end 153 of the wall member 152 of the conduit 150 and the base portion 167 of the shaft exterior surface 164 of the shaft member 160. In the present example, the intersecting angle $\theta_i$ is approximately 90 degrees.

Referring to FIG. 1A, in the present example, the compression member 170 is disposed across from the shaft member 160 to form a conduit receiving space 185 configured to receive a wall member 152 of the conduit 150 therebetween. Referring to FIGS. 1A and 13, the compression member 170 includes a compression portion 172 configured to compress the exterior wall surface 154 of the wall member 152 of the conduit 150 by a compressed amount $a_c$ in a manner such that the interior wall surface 156 of the wall member 152 of the conduit 150 is forced against the sidewall portion 168 of the shaft member 160 and the end 153 of the wall member 152 of the conduit 150 is forced against the base portion 167 of the shaft member 160.

Figure 2A:
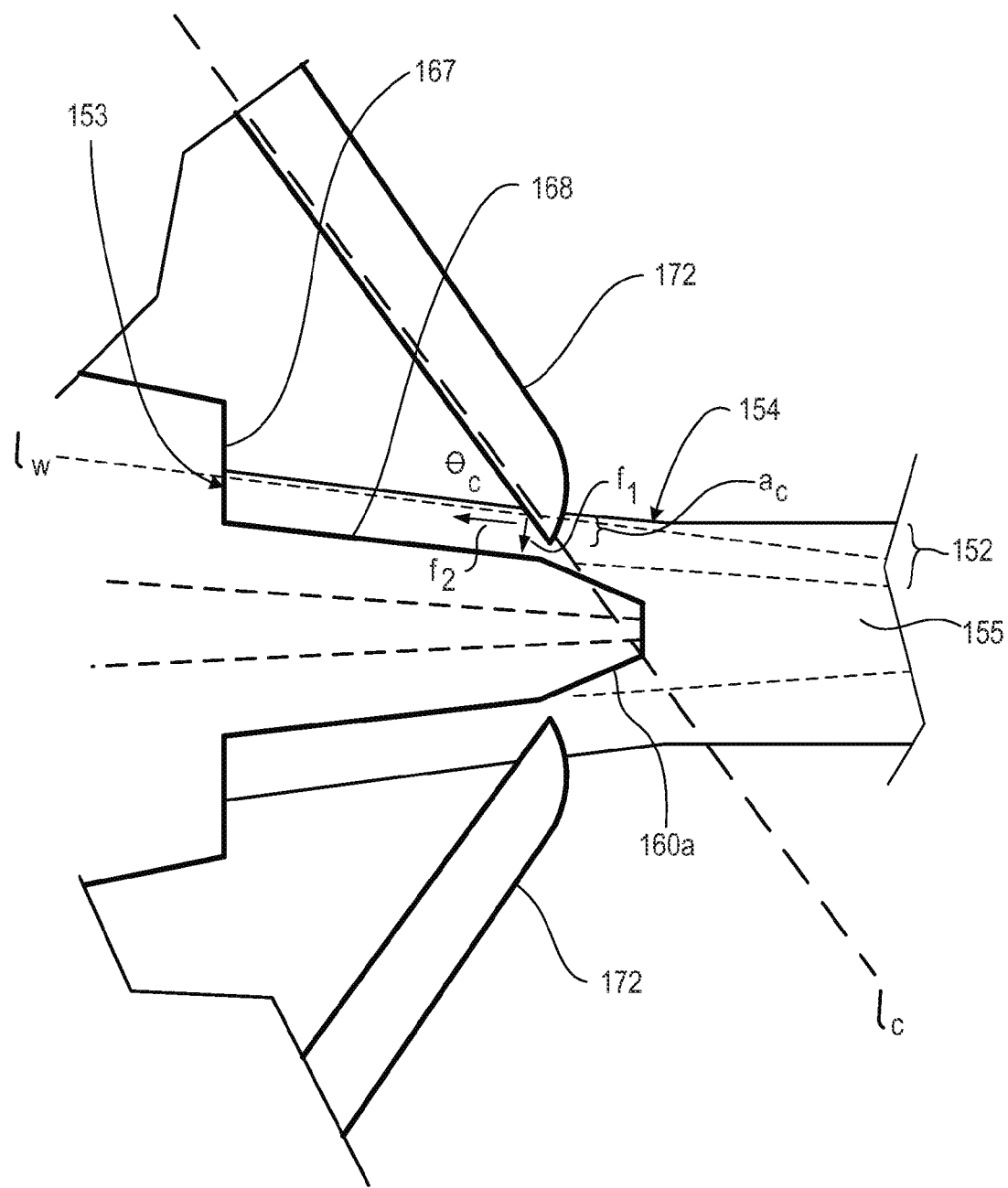
FIG. 2A is an exploded view of a portion of FIG. 1B according to an example of the present disclosure.
Figure 2B:
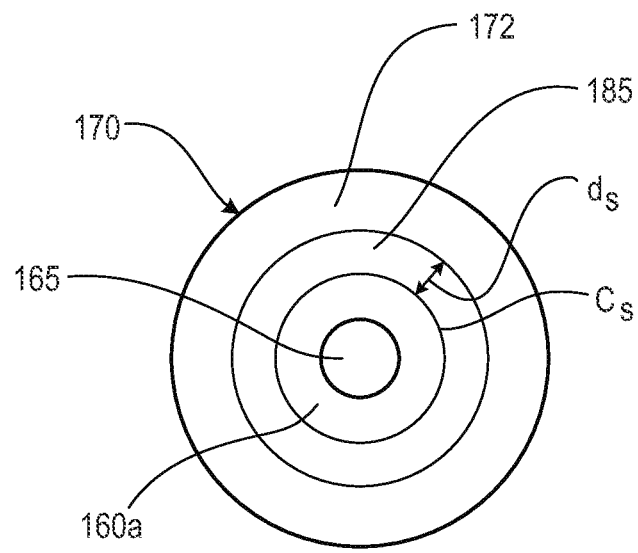
FIG. 2B is a cross-sectional view taken along line 2B-2B of FIG. 1A according to an example of the present disclosure.
Figure 2C:
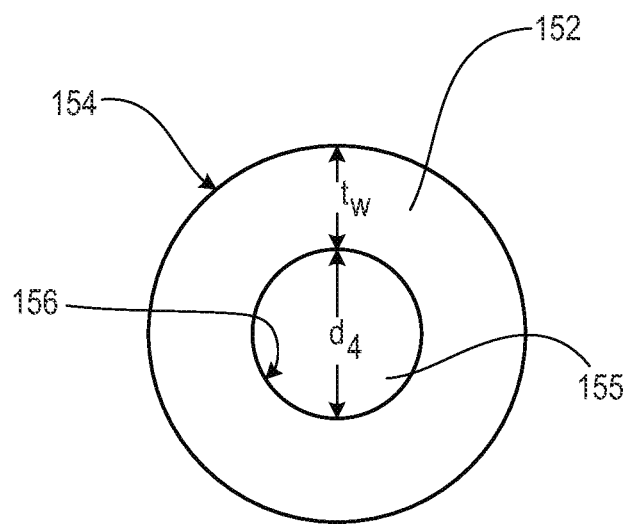
FIG. 2C is a cross-sectional view taken along line 2C-2C of FIG. 1B according to an example of the present disclosure.
Figure 2D:
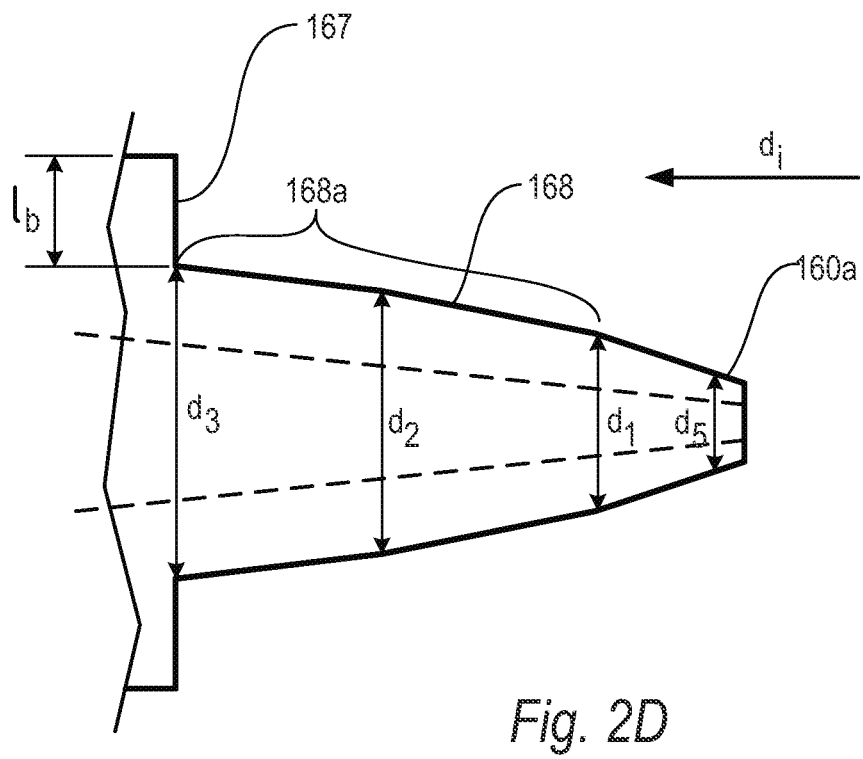
FIG. 2D is an exploded view of a portion of the mounting apparatus of FIG. 1A according to an example of the present disclosure.
Figure 2E:
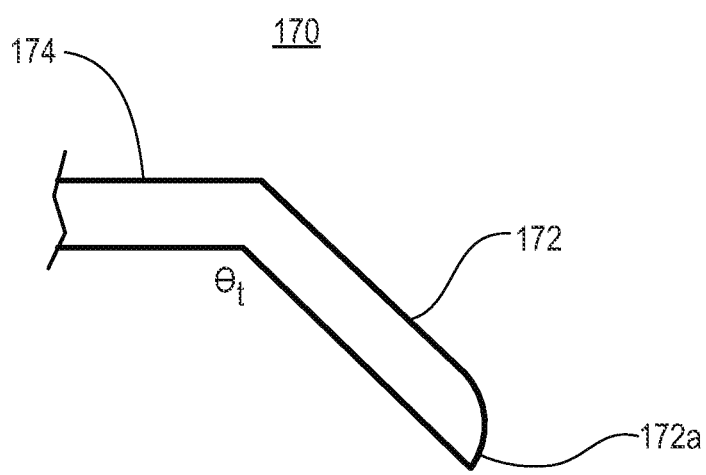
FIG. 2E is an exploded view of a portion of FIG. 1A according to an example of the present disclosure.

Referring to FIG. 2E, in an example, the compression member 170 may also include a main body 174 forming a transition angle $θ_t$ with the compression portion 172, and the compression portion 172 may have a curved end 172a. In the present example, the compressed amount $a_c$ is in a range of 20-35% compression by volume or cross sectional area of a thickness $t_w$ of the wall member 152 of the conduit 150. An adequate amount of compression creates a line seal around the conduit 150 such that it is fluid tight and has adequate holding force to axial loads on the conduit 150. The compression amount $_{ac}$ below 10% to 20% generally may be conducive to leaks, whereas the compression amount $a_c$ generally above 30% to 40% may contribute to the seal taking a compression set and potentially prematurely fail. Further, the compression amount a, below 20% may not provide adequate reactive force to resist axial loads that may pull the conduit 150 away from its seal. In an example, the compressed amount $a_c$ is 27% compression by volume or cross sectional area of the thickness $t_w$ of the wall member 152 of the conduit 150. In an example, the conduit mounting system 100 may be used in an ink supply system of a printing system to transport air to provide adequate pressure for the appropriate flow of ink therein. Thus, in an example, the conduit 150 may transport pressurized air, for example, between a pump and an ink supply.

FIG. 2A is an exploded view of a portion of FIG. 1B according to an example of the present disclosure. Referring to FIG. 2A, in an example, the compression portion 172 of the mounting apparatus 110 illustrated in FIG. 1B is configured to contact the wall member 152 at a compression angle $θ_c$ such that a first component $f_1$ of the force is in a direction perpendicular to the sidewall portion 168 of the shaft member 160 and a second component $f_2$ of the force is in a direction perpendicular to the base portion 167 of the shaft member 160. In an example, the compression portion 172 may contact the exterior wall surface 154 where a line $l_c$ generally parallel to and passing through the compression portion 172 intersects with a line $l_w$ generally parallel to and passing through the exterior wall surface 154 of the conduit 150. Such forces assist in establishing and/or maintaining contact between each of the base portion 167 and the sidewall portion 168 of the shaft member 160 with the conduit 150. Thus, establishing a secure connection between the conduit 150 and mounting apparatus 110. In examples, the compression angle $θ_c$ is in a range of 10-80 degrees. Such a compression angle range creates desirable force vectors. For example, a compression angle $θ_c$ in a lower end of the range enhances compression against the sidewall portion 168 and also aids assembly. Whereas, the compression angle $θ_c$ in an upper end of the range allow for coordinated conduit geometries.

Figure 3:
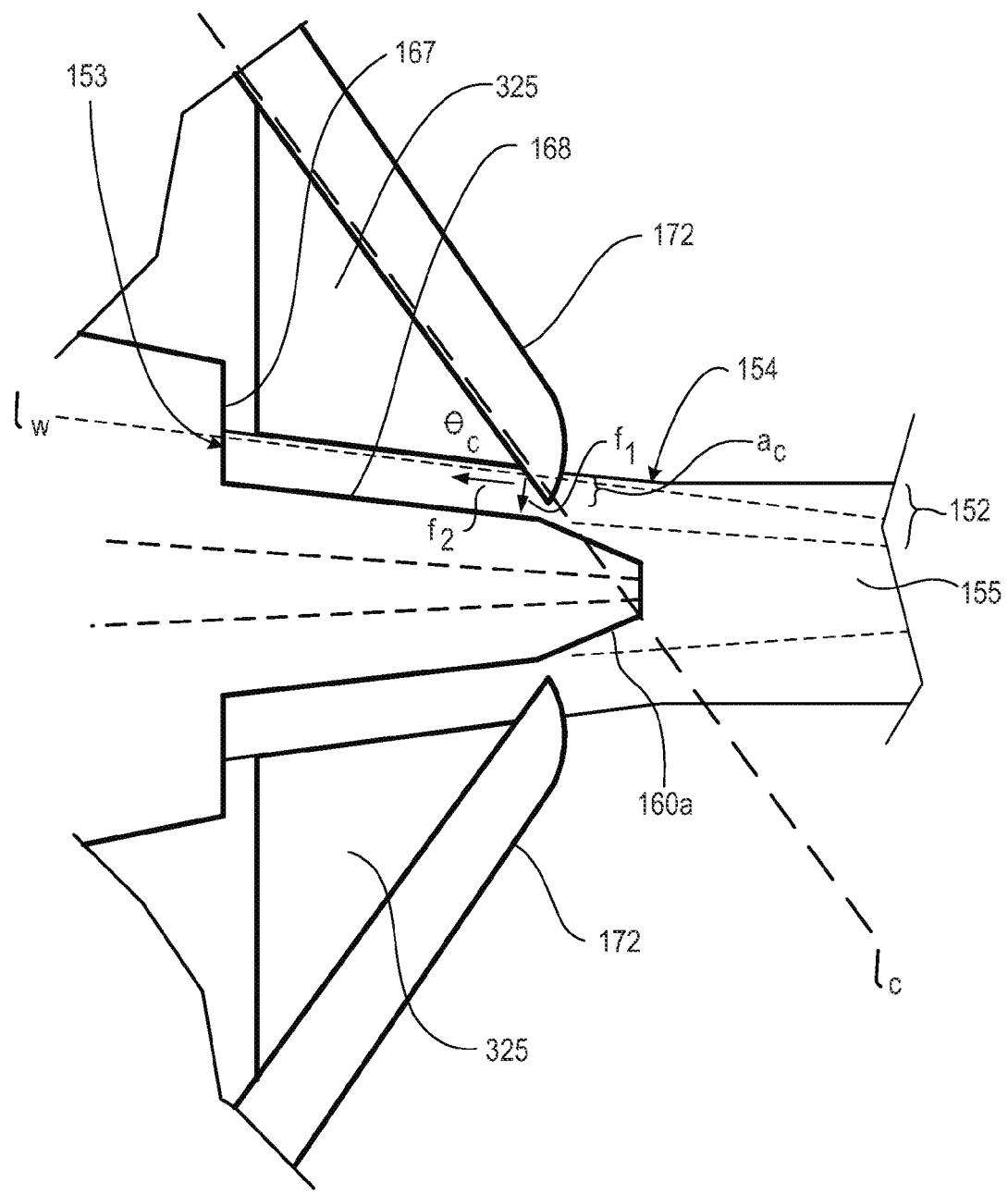
FIG. 3 is side view illustrating a portion of a mounting apparatus including a compression member having ribs according to an example of the present disclosure.

FIG. 3 is side view illustrating a portion of a mounting apparatus including a compression member having ribs according to an example of the present disclosure. Referring to FIG. 3, in an example, the compression member 170 may include ribs 325 thereon. The ribs 325 may be disposed across from the sidewall portion 168 of the shaft member 160, and may be configured to contact the exterior wall surface 154 of the wall member 152 of the conduit 150. In an example, the ribs 325 are configured to compress the exterior wall surface 154 of the conduit 150 to force the interior wall surface 156 of the conduit 150 against the sidewall portion 168 of the shaft member 160. Further, the ribs 325 assist the compression member 170 in providing a fluid tight seal between the conduit 150 and the shaft member 150 of the mounting apparatus 110.

FIG. 2B is a cross-sectional view taken along line 2B-2B of FIG. 1A according to an example of the present disclosure. FIG. 2C is a cross-sectional view taken along line 2C-2C of FIG. 1B according to an example of the present disclosure.

Referring to FIGS. 1A-2B, in an example, the compression member 170 surrounds the sidewall portion 168 of the shaft member 160. As illustrated in FIGS. 2B and 2C, a two-dimensional shape of the conduit receiving space 185 corresponds to a two-dimensional shape of the conduit 150. A distance $d_s$ of the conduit receiving space 185 is less than a thickness $t_w$ of the wall member 152 of the conduit 150. For example, the distance $d_s$ of the conduit receiving space 185 may be in a range of 20 to 30% of a thickness $t_w$ of a wall member 152 of the conduit 150. In the present example, the distance may be 27%. Referring to FIGS. 2B and 2C, an example of the two dimensional shape of the conduit receiving space 185 is a circular ring which corresponds with the two-dimensional shape of the conduit 150. In other examples, the conduit 150 and the conduit receiving space 185 may have corresponding shapes other than a circular shape.

FIG. 2D is an exploded view of a portion of the mounting apparatus of FIG. 1A according to an example of the present disclosure. Referring to FIG. 2D, the sidewall portion 168 includes a conduit insertion path 168a and a circumference $c_s$ (FIG. 2B) having diameters $d_1$, $d_2$, and $d_3$ transverse to the conduit insertion path 168a. Each of a subsequent diameter is equal or greater than each of a previous diameter along the conduit insertion path 168a in a conduit insertion direction $d_i$. For example, as illustrated in FIG. 2D, $d_2$ is greater than $d_1$, and $d_3$ is greater than $d_2$. In an example, the circumference $c_s$ of the sidewall portion 168 is tapered in a continuous manner in which the diameter $d_3$ of the circumference $c_s$ of the sidewall portion 168 closest to the base portion 167 is greater than the diameter $d_1$ of the circumference $c_s$ of the sidewall portion 168 furthest from the base portion 167. In an example, the diameter $d_1$ of the circumference $c_s$ of the sidewall portion 168 furthest from the base portion 167 is greater than the diameter $d_4$ of the conduit fluidic channel 155 of the conduit 150 in an uninstalled state. The shaft fluidic channel 165 of the shaft member 160 may be tapered in a manner in which a diameter of the shaft fluidic channel 165 narrows along the conduit insertion direction di. In an embodiment, a length $l_b$ of the base portion 167 is nearly equal or greater than the thickness $t_w$ of the wall member 152 of the conduit 150 (FIG. 2C). Referring to FIG. 2D, in an example, the shaft member 160 may include a tapered end 160a having a diameter $d_5$ less than a diameter $d_4$ of the conduit 150 (FIG. 2C). The tapered end 160a may be disposed and/or extend upstream from the compression portion 172 with respect to the conduit insertion direction $d_i$.

The present disclosure has been described using non-limiting detailed descriptions of example embodiments thereof that are provided by way of example and are not intended to limit the scope of the disclosure. It should be understood that features and/or operations described with respect to one embodiment may be used with other embodiments and that not all embodiments of the disclosure have all of the features and/or operations illustrated in a particular figure or described with respect to one of the embodiments. Variations of embodiments described will occur to persons of the art. Furthermore, the terms "comprise," "include," "have" and their conjugates, shall mean, when used in the disclosure and/or claims, "including but not necessarily limited to."

It is noted that some of the above described embodiments may describe structure, acts or details of structures and acts that may not be essential to the disclosure and which are described as examples. Structure and acts described herein are replaceable by equivalents, which perform the same function, even if the structure or acts are different, as known in the art. Therefore, the scope of the disclosure is limited only by the elements and limitations as used in the claims.

What is claimed is:

1. A conduit mounting system, comprising:
a conduit including a conduit fluidic channel therein and a wall member surrounding the conduit fluidic channel, the wall member including an end, an exterior wall surface, and an interior wall surface;
a shaft member having a shaft fluidic channel therein and a shaft exterior surface, the shaft exterior surface including a base portion and a sidewall portion forming an intersecting angle therebetween; and
a compression member integral with the shaft member and disposed across from the sidewall portion of the shaft member, the compression member having a compression portion configured to compress the exterior wall surface of the conduit by a compressed amount in a manner such that the interior wall surface of the conduit is forced against the sidewall portion of the shaft member and the end of the wall member of the conduit is forced against the base portion of the shaft member.

2. The system according to claim 1, wherein the compression portion is configured to contact the exterior wall surface at a compression angle with respect to a line parallel to the external wall surface of the conduit such that a first component of the force is in a direction perpendicular to the sidewall portion of the shaft member and a second component of the force is in a direction perpendicular to the base portion of the shaft member.

3. The system according to claim 2, wherein the compression angle is in a range of 10 to 80 degrees, the intersecting angle is in a range of 85 to 95 degrees, and the compressed amount is in a range of 20 to 35 percent compression by volume or cross sectional area of a thickness of the wall member of the conduit.

4. The system according to claim 3, wherein the compression member surrounds the sidewall portion of the shaft member, the compression member having a plurality of ribs configured to contact an exterior wall surface of the wall member of the conduit.

5. A mounting apparatus usable with a conduit, the mounting apparatus comprising:
a shaft member having a shaft exterior surface and a shaft fluidic channel therein, the shaft exterior surface including a base portion and a sidewall portion forming an intersecting angle therebetween; and
a compression member integral with the shaft member and disposed across from the sidewall portion of the shaft member to form a conduit receiving space between the compression member and the sidewall portion, the conduit receiving space to receive the conduit, the compression member having a compression portion oriented at a compression angle with respect to the sidewall portion of the shaft member;
wherein the intersecting angle is in a range of 85 to 95 degrees and the compression angle is in a range of 10 to 80 degrees.

6. The mounting apparatus according to claim 5, wherein the compression member surrounds the sidewall portion of the shaft member, the compression member having a plurality of ribs configured to contact an exterior wall surface of a wall member of the conduit.

7. The mounting apparatus according to claim 6, wherein a two-dimensional shape of the conduit receiving space corresponds to a two-dimensional shape of the wall member of the conduit, and a distance of the conduit receiving space is in a range of 20 to 35% of a thickness of the wall member of the conduit.

8. The mounting apparatus according to claim 5, wherein the compression member is configured to compress an exterior wall surface of a wall member of the conduit in a manner such that an interior wall surface of the wall member of the conduit is forced against the sidewall portion of the shaft member and an end of the wall portion of the conduit is forced against the base portion of the shaft member.

9. The mounting apparatus according to claim 8, wherein the compression member is to compress the exterior wall surface of the conduit by a compressed amount in a range of 20 to 35% compression by volume or cross sectional area of a thickness of the wall member of the conduit.

10. The mounting apparatus according to claim 5, wherein the sidewall portion further comprises:
a conduit insertion path and a circumference having plurality of diameters transverse to the conduit insertion path, wherein each of a subsequent diameter of the plurality of diameters is equal to or greater than each of a previous diameter of the plurality of diameters along the sidewall portion in a conduit insertion direction.

11. A method of providing a mounting apparatus usable with a conduit, the method comprising:
providing a shaft member with a shaft exterior surface and a shaft fluidic channel therein, the shaft exterior surface including a base portion and a sidewall portion forming an intersecting angle therebetween; and
integrally connecting a compression member to the shaft member, the compression member having a compression portion disposed across the sidewall portion of the shaft member to form a conduit receiving space configured to receive a wall member of the conduit, the compression portion configured to compress an exterior wall surface of the wall member of the conduit by a compressed amount in a manner such that an interior wall surface of the wall member of the conduit is forced against the sidewall portion of the shaft member and an end of the wall member of the conduit is forced against the base portion of the shaft member.

12. The method according to claim 11, wherein the compression portion is configured to contact the exterior wall surface of the conduit at a compression angle with respect to a line parallel to the external wall surface of the conduit such that a first component of the force is in a direction perpendicular to the sidewall portion of the shaft member and a second component of the force is in a direction perpendicular to the base portion of the shaft member.

13. The method according to claim 12, wherein the compression angle is in a range of 10 to 80 degrees, the intersecting angle is in a range of 85 to 95%, and the compressed amount is in a range of 20 to 30% compression by volume or cross sectional area of a thickness of the wall member of the conduit.

14. The method according to claim 13, wherein the compression member surrounds the sidewall portion of the shaft member and a two-dimensional shape of the conduit receiving space corresponds to a two-dimensional shape of the conduit, the compression member having a plurality of ribs configured to contact an exterior wall surface of the wall member of the conduit.

15. The method according to claim 14, wherein a distance of the conduit receiving space is in a range of 20 to 30% of a thickness of the wall member of the conduit.

* * * * *